United States Patent [19]

Wang

[11] Patent Number: 4,489,419
[45] Date of Patent: Dec. 18, 1984

[54] DATA COMMUNICATION SYSTEM

[76] Inventor: An Wang, Bedford Rd., Lincoln, Mass. 01773

[21] Appl. No.: 617,829

[22] Filed: Jun. 6, 1984

Related U.S. Application Data

[63] Continuation of Ser. No. 316,303, Oct. 29, 1981, abandoned.

[51] Int. Cl.³ .......................... H04B 3/00; H01R 7/30; H01R 13/64
[52] U.S. Cl. ........................................ 375/36; 174/56; 174/66; 220/3.3; 220/3.9; 339/122 R; 339/125 R; 339/130 R; 339/184 R; 375/7; 455/3
[58] Field of Search ................ 455/3, 5; 179/1 PC; 358/86; 375/7, 36; 339/122 R, 123, 184 R, 184 M, 125 R, 126 J; 285/DIG. 15; 174/55, 56, 66; 220/3.3, 3.9, 241

[56] References Cited

U.S. PATENT DOCUMENTS

| | | | |
|---|---|---|---|
| 2,394,363 | 2/1946 | Bynoe | 285/DIG. 15 |
| 2,427,349 | 9/1947 | Boynton | 339/123 |
| 2,764,429 | 9/1956 | Betzler | 339/125 R |
| 3,194,588 | 7/1965 | Buckey et al. | 285/DIG. 15 |
| 3,218,597 | 11/1965 | Oehlerking et al. | 339/122 R |
| 3,699,250 | 10/1972 | Bunting | 455/3 |
| 3,851,104 | 11/1974 | Willard et al. | 370/85 |

FOREIGN PATENT DOCUMENTS 40891 4/1978 Japan ............................ 339/125 R Primary Examiner—Marc E. Bookbinder

[57] ABSTRACT

A data communication system for the transmission of electrical information signals among a plurality of user devices removably connected to the system which transmit signals over receive and transmit branches of coaxial cable. An interface is connected to each user device, providing a signal transmit portion and a signal receive portion. Each interface has a threaded plug connector connected to its signal transmit portion, and a threaded plug connector connected to its signal receive portion.

The system further providing a plurality of outlets each connected to the receive and transmit branches through receive and transmit drop lines respectively, each outlet provides a threaded receptacle connected to the transmit drop line and a threaded receptacle connected to the receive drop line. The mating threaded portions of every transmit plug connector and transmit receptacle are threaded in a first sense, and the mating threaded portions of every receive plug connector and transmit receptacle are threaded in a second sense, so that any interface means is removably connectable to any outlet only in a correct transmit-receive relationship.

2 Claims, 3 Drawing Figures

DATA COMMUNICATION SYSTEM

The present application is a continuation of U.S. patent application No. 316,303 filed Oct. 29, 1981 by An Wang for a DATA COMMUNICATION SYSTEM, subsequently abandoned.

This invention relates to data communications systems using pairs of coaxial cables as the transmission medium connecting user devices, for the transmission of electrical information signals among the devices.

In many applications involving data communications, the use of pairs of coaxial cables offers advantages over the use of a single coaxial cable for the transmission of electrical information signals through the system. For example, a single cable two-way system must apportion the frequency spectrum between inbound and outbound signal propagation, resulting in a split spectrum and generally unequal frequency allocation, whereas a two-cable system inherently provides identical and full bandwidth in both directions. Additionally, on a two-cable network, devices can transmit and receive on the same frequency since the separate cables provide space division, whereas a single cable network must provide a frequency translator device at the head end to convert each inbound signal to an outbound frequency channel. Thus, the frequency allocation process is simplified in a two-cable system. Other advantages, such as better isolation, are also provided by a two-cable system.

When using coaxial cables in pairs, each pair comprising a transmit branch and a receive branch of the cable, the transmit and receive portions of the user device must be connected to the transmit and receive cables of the transmission medium, respectively. It is obviously essential that the cables and user devices be correctly connected together. For permanently installed user devices connected through dedicated connection means to the transmission medium, this requirement does not pose a problem. However, in many applications of data communications systems it is desirable to provide a flexible system configuration, making it possible to interchange devices, to connect in a new device, or to disconnect an existing device. To provide ease of use, it is desirable that such connections should not require any technical knowledge or expertise, but rather should be easily performed by any person likely to be using the user devices. When the particular application is of this nature, it becomes important to make the connecting means simple to operate, and to insure that the connection cannot be wrongly made. At the same time, whatever connecting means are used must provide a good and reliable seal, as a shield against radio frequency interference.

The correct connections between the user device and the transmission medium can be indicated by means of symbols (such as color coding, or printed letters) applied to physically identical pairs of connecting means. This approach has the disadvantage that the symbols may be misread, or ignored, or not seen in poor light conditions, or may be damaged or worn away. In such cases, the cables can be connected wrongly despite the symbols, and the system will malfunction.

Alternatively, the correct connections can be indicated by a method which physically prevents misconnection, as by providing two different kinds of connection means, one for transmit and one for receive cables. An advantage of this approach is that a misconnection cannot be made.

Generally, the prior art has used the second approach, and has attempted to ensure correct connection by using two connectors that have physically different coupling methods.

There are three common kinds of coaxial cable connectors: the bayonet, the threaded, and the push-pull coupler. Of these, the threaded connectors are the most reliable. Threaded connectors provide a good seal, giving better radio frequency isolation than is available from push-pull connectors. Also, threaded connectors are less expensive than the other two kinds. The bayonet connector, which is more complex in construction than the threaded connector, costs from six to fifteen times as much as a threaded connector. Push-pull connectors are less expensive than bayonet connectors, but also provide lower noise immunity and lower reliability.

The use of two physically different connectors to ensure correct connection is exemplified in the prior art by the use of one bayonet and one threaded connector used on the pairs of cables connecting word processing work stations to the master disk unit.

A pair of one bayonet and one threaded connector provides good immunity from radio frequency interference and is fairly reliable. However, in large quantities, the cost of this solution is high, because of the much greater cost of the bayonet connector. A pair including one push-pull connector, although less expensive than a bayonet-threaded connector pair, is also relatively less reliable.

It would therefore be desirable to provide a data communications system using a two-branch coaxial cable transmission medium having cable connection means that is highly reliable, inexpensive, and easy for non-technical personnel to use, and that physically ensures correct connection of the user devices to the cable. It is an object of the present invention to provide such a system.

According to the invention, a data communication system is provided for the transmission of electrical information signals among a plurality of user devices removably connected to the system. The data communication system has a signal transmission medium comprising signal receive and signal transmit branches of coaxial cable, and provides a plurality of interface means each for connection to a user device and each providing a signal transmit portion and a signal receive portion.

Each interface means further provides a coaxial cable transmit threaded plug connector connected to the signal transmit portion, and a coaxial cable receive threaded plug connector connected to the signal receive portion. The data communication system further provides a plurality of outlets, each outlet being connected to the receive and transmit coaxial cable branches through receive and transmit drop lines respectively. Each outlet provides a coaxial cable transmit threaded receptacle connected to the transmit drop line and a coaxial cable receive threaded receptacle connected to the receive drop line. A transmit threaded plug connector and a transmit threaded receptacle together comprise a transmit cable connector, and a receive threaded plug connector and a receive threaded receptacle together comprise a receive cable connector. The mating threaded portions of every transmit cable connector are threaded in a first sense, and the mating threaded portions of every receive cable connector are threaded in a second sense, whereby any interface means is removably connectable to any outlet only in a correct transmit-receive relationship.

In a preferred embodiment, an outlet comprises a box structure having first and second flanges, each flange providing a slot; the box structure further has a raised portion comprising a ramped surface of height increasing from the first flange toward the second flange, and a terminal face generally at a right angle to the ramped surface, the receptacles being mounted on the terminal face. The outlet further comprises a plate having a central aperture adapted to permit the box structure raised portion to pass through the plate, with the flanges lying under the plate adjacent the aperture; the plate provides screw holes adapted to coincide with the flange slots, the outlet being adapted to be mounted to a wall by means of screws passing through the flange slots and plate screw holes, with the first flange placed higher than the second flange, whereby the receptacles are directed downwardly and slightly outwardly of the wall.

BRIEF DESCRIPTION OF THE FIGURES

Other objects, features and advantages will appear from the following detailed description of a preferred embodiment, together with the drawing, in which:

Referring to the drawings, FIG. 1 shows in schematic form, as an example of a data communications system of the type to which the invention pertains, the elements of a data communications system 10, in which a plurality of user devices 12 are each connected, through a modem, or other suitable interface means, to the transmission medium, a coaxial cable. The coaxial cable is provided in two branches, a first branch 16 (transmit line) which receives electrical information signals transmitted from any user device, and a second branch 18 (receive line) which provides electrical information signals to be received by any user device. All user devices are connected in the same sense to the cables, through drop lines 19 from receive branch 18, and drop lines 17 from transmit branch 16.

Figure 1:
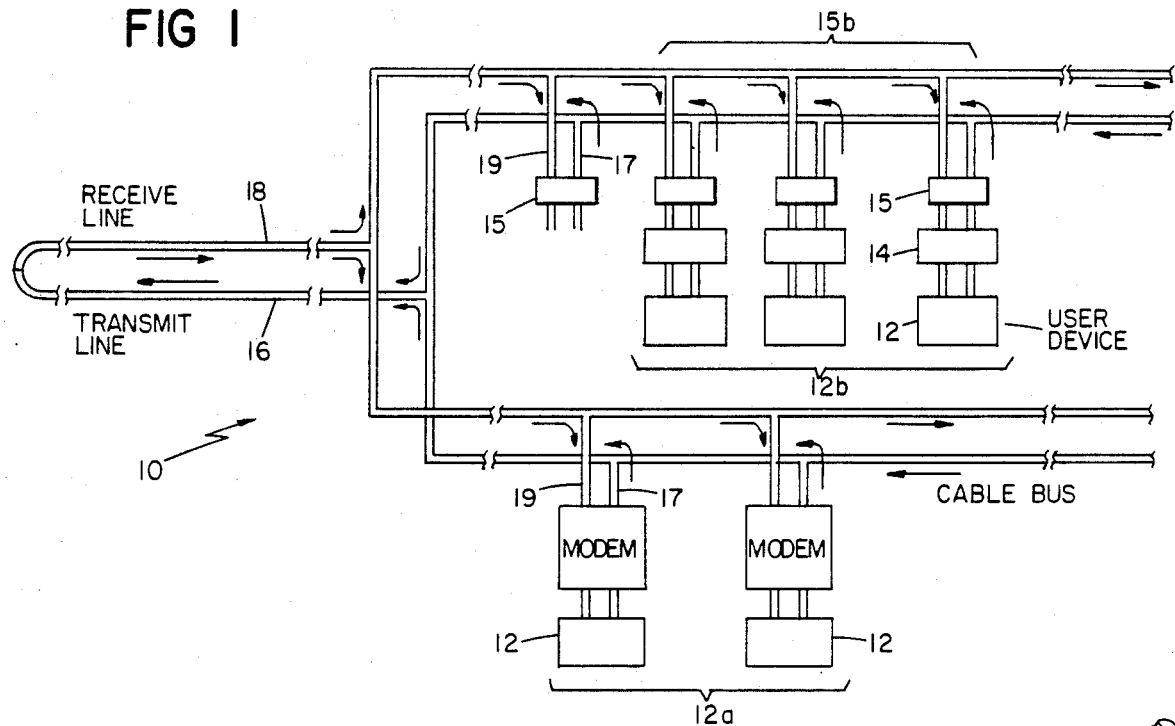
FIG. 1 is a schematic showing of a local network of the kind to which the invention relates.

The data communications system of FIG. 1 might be, for example, a local network of the type provided within a particular locality (for example, a large office building, or a military facility such as an aircraft carrier). To install such a network, the two branches of coaxial cable are strung throughout the facility to be served, to be available for connection of user devices throughout the facility, without being limited to a particular existing set of user devices to be served. Certain of the user devices to be served by the network are more or less permanently connected to the network through dedicated drop lines and connection means, and are schematically represented in FIG. 1 by the devices 12a. Such devices typically comprise, for example, large computers, which remain connected to the network at all times, and the network is designed initially with such devices in mind.

However, for ease and flexibility of use of the network, it is extremely desirable to make it possible to connect and disconnect further user devices simply and easily, in a mannner no more difficult or complex than plugging or unplugging a table lamp at a household electrical outlet. For example, the work stations of a word processing system may desirably be moved about the office in which they are used as the business changes or grows, and it may be desirable to add new work stations or printers to the network. For this purpose, at frequent and convenient locations within the facility served by the network, wall outlets 15 are provided, the receive and transmit cable branches 18 and 16 being connected into each outlet through drop lines 19 and 17 respectively. Any user device provided with an appropriate and standard interface 14 can be connected into the network 10 by connecting the interface 14 to the outlet 15.

The group of devices connected to the network 10 through wall outlets is schematically indicated in FIG. 1 as 12b. An additional wall outlet 15 is provided, to which no user device is connected as shown in the Figure, to indicate schematically the availability of a wall outlet for ready connection to the network.

Figure 2:
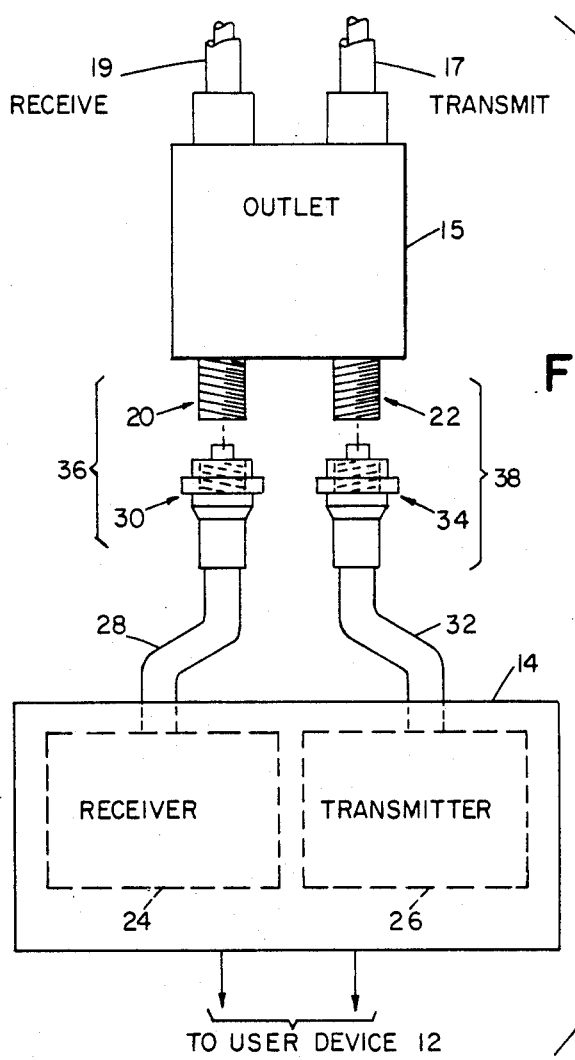
FIG. 2 shows in simplified form the elements forming the connection between the transmission medium and the user device.

Referring now to FIG. 2, a wall outlet 15 is shown in schematic form, and has two externally threaded female receptacles 20 and 22. Receive receptacle 20 is connected to receive drop line 19; transmit receptacle 22 is connected to transmit drop line 17.

Interface unit 14 includes within it circuitry forming receiver portion 24 and transmitter portion 26. Such circuitry is well known in the art, forms no part of the present invention, and will not be described in detail. Connected to receiver portion 24 is a short length of coaxial cable 28 terminated by a receiver male plug connector 30. Similarly, connected to transmitter portion 26 is a short length of coaxial cable 32 terminated in a transmit male plug connector 34. The receiver and transmitter portions of interface 14 are connected through further circuitry, not material here, to the user device 12.

Plug connectors 30 and 24 include internally threaded portions. Receive plug connector 30 and receive receptacle 20 together comprise receive cable connector 36; transmit plug connector 34 and transmit receptacle 22 together comprise transmit cable connector 38. Cable connectors 36 and 38 are both threaded connectors. The mating threaded portions of receive cable connector 36 are threaded in a first sense (either right or left hand thread); the mating threaded portions of transmit cable connector 38 are threaded in a second sense (left or right). Preferably, the transmit and receive cable connectors have threads of the same pitch and diameter but of opposite handedness. It is thus impossible to connect the interface receiver circuitry 24 to the transmit drop line 19 and transmit cable branch 18, because of the incompatibility of threads between receive plug connector 30 and transmit receptacle 22. Similarly, the interface transmitter circuitry 26 cannot be connected to the receive drop line 17 and receive cable branch 16, because of the incompatibility of threads between transmit plug connector 34 and receive receptacle 20.

At the same time, both receive and transmit connections are made with the highest possible reliability, and the total cost of the connecting means between the cable pair 16 and 18 and the user device is very low.

Figure 3:
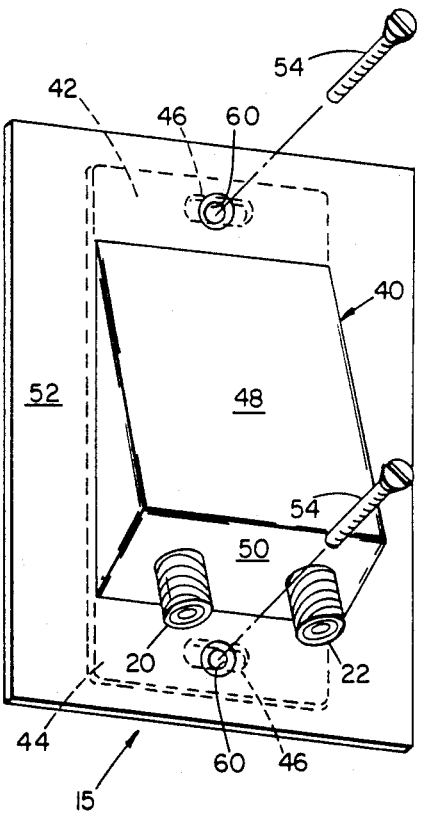
FIG. 3 is a perspective view of a portion of FIG. 2.

FIG. 3 shows a perspective view of the actual outlet box 15. The outlet comprises an asymmetrical box structure 40, having upper and lower (first and second) flanges 42, 44, each provided with a slot 46. Structure 40 includes a raised portion having a ramped surface 48 of height increasing from upper flange 42 toward lower flange 44; a terminal face 50 is provided generally at a right angle to ramped surface 48. Receptacles 20 and 22 are mounted on the terminal face 50. A plate 52 has a generally central aperture that permits the raised portion of box structure 40 to pass through the plate, while the flanges 42, 44 underlie plate 52 adjacent the aperture. Plate 52 provides screw holes 60 located to coincide with flange slots 46. Plate 52 together with box structure 40 are mounted to a wall by means of screws 54 which pass through screw holes 60 and slots 46. When the outlet 15 is so mounted to a wall, receptacles 20 and 22 are thereby directed downwardly (that is, toward the floor) and slightly outwardly of the wall. This arrangement helps to maintain the connected cables close to the wall, and reduces sidewise tension on the cable connectors 36 and 38.

In operation, a set 15-b of wall outlets is provided, attached by drop lines 17 and 19 to the cable pairs 16 and 18. All of the transmit receptacles 22 provided on the outlets 15 are threaded in a first sense, and all of the receive receptacles 20 are threaded in the second sense. For use with the wall outlets, each user device 12b to be connected to the set 15b of wall outlets is provided with an interface unit 14 having a transmit plug connector 34 threaded in the same sense as the transmit receptacles, and with a receive plug connector 30 threaded in the same sense as the receive receptacles. By this means, every user device 12 can be connected interchangeably through any wall outlet 15 to the data communications system in the correct transmit/receive relationship. No technical knowledge or ability is required to understand the proper connections; the devices cannot be misconnected.

As an aid to rapid use of the connections, all connector elements threaded in the first sense may be given a particular color code, and all connector elements threaded in the second sense may be given a different color code. However, even if such colors cannot be seen, the connectors of the system of the invention cannot be misconnected.

It has been found in use that there is no danger of stripping the threads when a user tries to connect mismatched threaded male and female connector elements.

Since it is important to terminate unused outlets 15 to prevent impedance imbalance on the line, terminators threaded in both senses are desirably provided for use in the system. The savings in cost provided by the use of threaded connector pairs rather than bayonet-threaded pairs is also realized by providing pairs of threaded terminators, rather than bayonet type terminators for a bayonet-type connector element on the outlet.

The invention is particularly advantageous in that both connections (transit and receive) are made in the most physically reliable way (threaded, rather than bayonet or push-pull), and thus provide better system operation than is provided when two physically different connections are used; at the same time, the cost of each pair of threaded connections is much less than that of a physically dissimilar pair.

The system of the invention need not be a local network of the kind described; the invention may also be embodied in a CATV system or transmission line system.

What is claimed is:

1. A data communication system for the transmission of electrical information signals among a plurality of user devices removably connected to said system, said data communication system having a signal transmission medium comprising signal receive and signal transmit branches of coaxial cable, a plurality of interface means each for connection to a user device and each providing a signal transmit portion and a signal receive portion, each interface means further providing a coaxial cable transmit threaded plug connector connected to said signal transmit portion, and a coaxial cable receive threaded plug connector connected to said signal receive portion, said data communication system further providing a plurality of outlets, each outlet being connected to said receive and transmit coaxial cable branches through receive and transmit drop lines respectively, each outlet providing a coaxial cable transmit threaded receptacle connected to said transmit drop line and a coaxial cable receive threaded receptacle connected to said receive drop line, a said transmit threaded plug connector and a said transmit threaded receptacle together comprising a transmit cable connector, and a said receive threaded plug connector and a said receive threaded receptacle together comprising a receive cable connector, the mating threaded portions of every said transmit cable connector being threaded in a first sense, and the mating threaded portions of every said receive cable connector being threaded in a second sense, whereby any said interface means is removably connectable to any said outlet only in a correct transmit-receive relationship, said outlet further comprising:

a box structure having first and second flanges, each said flange providing a slot, and a raised portion having a ramped surface of height increasng from said first flange toward said second flange, and a terminal face generally at a right angle to said ramped surface, said receptacles being mounted on said terminal face, and a plate having a generally central aperture adapted to permit said box structure raised portion to pass through said plate, said flanges underlying said plate adjacent said aperture, said plate providing screw holes adapted to coincide with said flange slots, said plate being mountable to a wall by means of screws passing through said flange slots and plate screw holes, with said first flange placed higher than said second flange, whereby said receptacles are directed downwardly and slightly outwardly of the wall.

2. A data communication system for the transmission of electrical information signals among a plurality of user devices removably connected to said system, said data communication system having a signal transmission medium comprising signal receive and signal transmit branches of coaxial cable, a plurality of interface means each for connection to a user device and each providing a signal transmit portion and a signal receive portion, each interface means further providing a coaxial cable transmit threaded plug connector connected to said signal transmit portion, and a coaxial cable receive threaded plug connector connected to said signal receive portion, said data communication system further providing a plurality of outlets, each outlet being connected to said receive and transmit coaxial cable branches through receive and transmit drop lines respectively, each outlet providing a coaxial cable transmit threaded receptacle connected to said transmit drop line and a coaxial cable receive threaded receptacle connected to said receive drop line, a said transmit threaded plug connector and a said transmit threaded receptacle together comprising a transmit cable connector, and a said receive threaded plug connector and a said receive threaded receptacle together comprising a receive cable connector, the mating threaded portions of every said transmit cable connector being threaded in a first sense, and the mating threaded portions of every said receive cable connector being threaded in a second sense, any said interface means being removably connectable to any said outlet only in a correct transmit-receive relationship, said outlet comprising:

a box structure having first and second flanges, and a raised portion having a ramped surface of height increasing from said first flange toward said second flange, and a terminal face generally at a right angle to said ramped surface, said receptacles being mounted on said terminal face, said flanges having screw holes and adapted to be mounted to a wall by means of screws passing through said screw holes with said first flange placed higher than said second flange, whereby said receptacles are directed downwardly and slightly outwardly of the wall.

* * * * *